US006747545B2

(12) United States Patent
Nowottnick et al.

(10) Patent No.: US 6,747,545 B2
(45) Date of Patent: Jun. 8, 2004

(54) PASSIVE KEYLESS ENTRY SYSTEM

(75) Inventors: Juergen Nowottnick, Hamburg (DE); Frank Boeh, Hamburg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 468 days.

(21) Appl. No.: 09/810,143

(22) Filed: Mar. 16, 2001

(65) Prior Publication Data
US 2001/0033222 A1 Oct. 25, 2001

(30) Foreign Application Priority Data

Mar. 20, 2000 (DE) .......................... 100 13 542

(51) Int. Cl.[7] .................. G05B 19/00; F06F 7/00; G08B 29/00; H04B 1/00; B60R 25/00
(52) U.S. Cl. ........................ 340/5.61; 340/5.7
(58) Field of Search ................ 340/5.6, 5.61–5.67, 340/5.7, 5.71–5.74, 825.69, 825.72, 825.73, 825.76

(56) References Cited

U.S. PATENT DOCUMENTS

| | | | | |
|---|---|---|---|---|
| 5,309,144 A | * | 5/1994 | Lacombe et al. | 340/539.23 |
| 5,499,022 A | * | 3/1996 | Boschini | 340/5.62 |
| 5,541,585 A | * | 7/1996 | Duhame et al. | 340/5.62 |
| 5,723,911 A | * | 3/1998 | Glehr | 340/10.5 |
| 6,483,425 B1 | * | 11/2002 | Avenel | 340/5.61 |

* cited by examiner

Primary Examiner—Michael Horabik
Assistant Examiner—Nam V Nguyen
(74) Attorney, Agent, or Firm—Kevin Simons

(57) ABSTRACT

An arrangement for a passive keyless entry system is disclosed, comprising a base station and a portable data carrier, wherein the data carrier and the base station are configured to determine authorized access of the base station, wherein first and second position information of the relative position of the data carrier with respect to the antenna coils and UHF receiver stages of the base station is gained from measurements of the low-frequency, magnetic alternating fields transmitted by LF transmitter stages of the base station to the data carrier, and the UHF signal transmitted by a UHF transmitter stage of the data carrier to the base station, wherein a signal representing authorized access is generated by the base station when both position information components differ by less than a predetermined extent.

5 Claims, 2 Drawing Sheets

PASSIVE KEYLESS ENTRY SYSTEM

The present invention describes the configuration of an entry security system, hereinafter also referred to as passive keyless entry system (PKE), having a greatly improved resistance against external attacks. PKE systems are increasingly used in the field of motor vehicle entry systems.

The system according to the invention is also suitable for realizing chip card-based secure entry systems used in the field of security for buildings.

Figure 1:
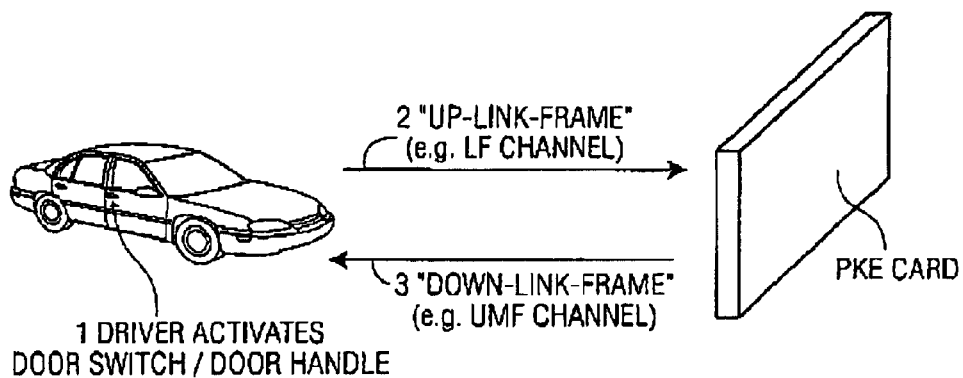

A possible configuration for realizing PKE systems is shown in FIG. 1 for an entry system for a motor vehicle 1. An up-link frame 2 constituted, for example, by a LF channel via which signals are transmitted from the vehicle to a chip card, here denoted as PKE card, and a down-link frame 3 constituted, for example, by a UHF channel via which the signals are transmitted from the PKE card to the vehicle are present as signal transmission connections between the vehicle 1 and the PKE card.

After activating, for example, the door handle of the vehicle, or a pushbutton on the door, a PKE base station in the vehicle starts generating a signal denoted as "challenge", which signal is transmitted to the PKE card via the up-link frame 2 (preferably constituted as LF channel with an inductive coupling). Subsequently, a circuit arrangement preferably including a microprocessor in the PKE card computes a signal sequence denoted as "response" from the "challenge" by means of a cryptographic algorithm and a secret key. This "response" signal is then transmitted to the PKE base station from the PKE card via the down-link frame 3 (preferably using a UHF channel). The PKE base station compares the "response" by means of a similar crypto-algorithm and a similar secret key. In the case of identity, the PKE base station allows opening of the vehicle.

The drawback of this arrangement is that an external attacker trying to open the vehicle can perform the so-called "relay attack" with relatively small technical effort.

Figure 2:
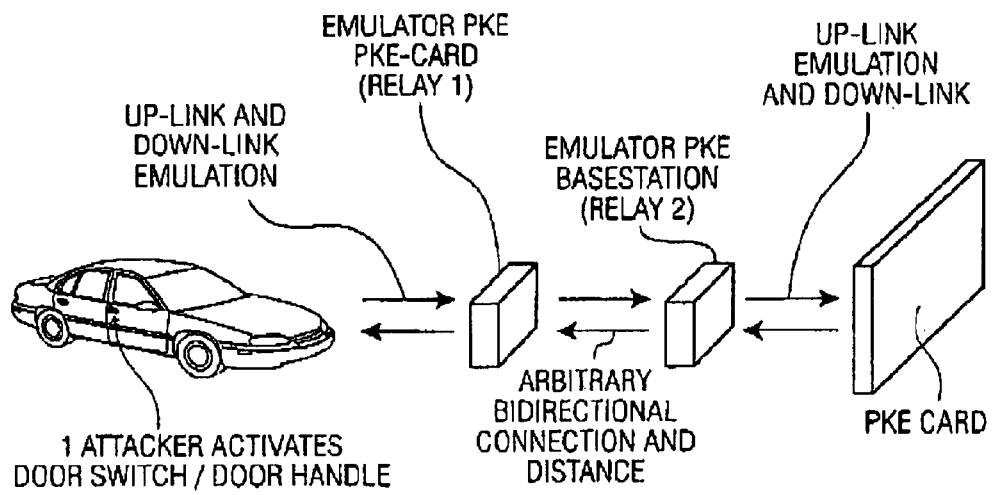

FIG. 2 shows diagrammatically an arrangement for performing such a "relay attack". For this purpose, the configuration in FIG. 1 comprises an additional transmission path consisting of an emulator PKE card, denoted as relay 1, an emulator PKE base station, denoted as relay 2, and a communication line between relay 1 and relay 2. An attacker with relay 1 is near the vehicle. The second attacker with relay 2 is within adequate distance from the valid PKE card. When the door handle is activated, the vehicle sends its "challenge" which is transmitted from relay 1 to relay 2 via said communication line. Relay 2 emulates the up-link frame and thus passes on the "challenge" to the valid PKE card. After computing the "response" in the PKE card, the PKE card responds to the relay 2 by transmitting this "response", i.e. the relay 2 transmits the "response" via said communication line to the relay 1 and from this relay to the PKE base station in the vehicle 1. Since the "response" was generated by the authentic PKE card on the basis of the authentic "challenge" of the PKE base station with the aid of the correct crypto algorithm and the correct key, the "response" is recognized as being valid so that the door of the vehicle opens.

It is an object of the invention to provide an arrangement of the type described above, making a "relay attack" at least essentially more difficult or perhaps even impossible.

According to the invention, this object is solved by an arrangement for a passive keyless entry system comprising a base station arranged on an object to be secured against unauthorized access, for example, a vehicle, and a data carrier ("PKE card") particularly a chip card which can be carried preferably by an authorized user, and, together with the base station, is adapted to determine authorized access and corresponding control of the base station for exchanging signals with the base station, a signal transmission from the base station to the data carrier being preferably performed by low-frequency, magnetic alternating fields and a signal transmission from the data carrier to the base station being preferably performed by high-frequency, electromagnetic alternating fields (UHF range), in which the base station comprises a first number (N) of LF transmitter stages and an antenna coil associated with each LF transmitter stage for transmitting low-frequency, magnetic alternating fields, and a second number of UHF receiver stages, the data carrier comprises a second number (M) of orthogonally aligned antenna coils each being coupled to an LF receiver stage for receiving low-frequency, magnetic alternating fields, the data carrier further comprises a UHF transmitter stage for transmitting a UHF signal, the base station comprises a third number of UHF receiver stages for receiving the UHF signal transmitted by the UHF transmitter stage of the data carrier, the base station and the data carrier comprise a control stage each for controlling the LF and UHF transmitter and receiver stages and for generating signals to be transmitted and evaluating received signals, first position information about the relative position of the data carrier with respect to the antenna coils of the base station is gained from a measurement of the low-frequency, magnetic alternating fields transmitted by the LF transmitter stages of the base station to the data carrier via the antenna coils of the data carrier in the control stage of the data carrier, which information is transmitted in a preferably encrypted form in the UHF signal from the data carrier to the base station, second position information about the relative position of the data carrier with respect to the UHF receiver stages of the base station is gained from a subsequent measurement of the UHF signal transmitted by the UHF transmitter stage of the data carrier to the base station via the UHF receiver stages of the base station in the control stage of the base station, a signal representing authorized access is generated by comparing both position information components in the control stage of the base station, which signal is only generated when both position information components differ by less than a predetermined extent.

The arrangement according to the invention thus provides an improved passive keyless entry system in which additional information is gained about the relative orientation and positioning between a data carrier (PKE card) and a base station which is preferably arranged in a vehicle. This information, denoted as position information, is used to verify the origin of data during the authentication process in the entry system. The data carrier comprises M antenna coils which are orthogonally arranged with respect to each other, as well as a UHF transmitter stage. The base station comprises N antenna coils which, in an arrangement of the entry system according to the invention, are arranged in the vehicle. Additionally, the base station is provided with a further number—typically but not necessarily equal to N—of UHF receiver stages. In a first step, the data carrier (PKE card) measures and computes its own orientation relative to the antenna coils of the base station. In a second step, the position information thus obtained is transmitted, preferably in an encrypted form, from the data carrier to the base station. The base station measures and computes the orientation of the data carrier from the phase or amplitude differences in the UHF signal received by the UHF receiver stages of the base station. The two position information components thus obtained independently of each other are compared and access is only granted when they correspond within predetermined measuring tolerances.

This arrangement can be advantageously used in access systems of general types, but particularly in vehicles, and for contactless triangulation.

The arrangement according to the invention is preferably constituted in such a way that the two position information components are determined by measuring the field strengths and/or the phase differences of the magnetic alternating fields at the locations of the antenna coils of the data carrier coupled to the respective LF receiver stages, or by measuring the UHF signal at the locations of the UHF receiver stages of the base station.

The described determination of the position information components in the arrangement according to the invention ensures that authorized entry can only be correctly granted to the authorized person and cannot be simulated by a "relay attack".

Figure 3:
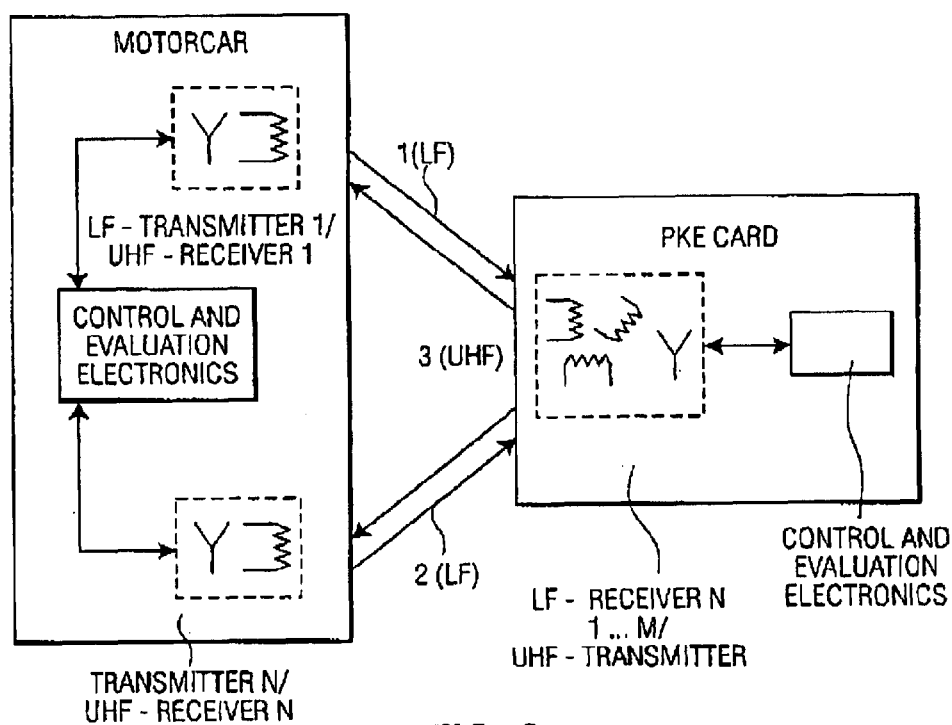

FIG. 3 shows diagrammatically the construction of an embodiment of a PKE system which is substantially resistant to external attacks.

In this system, a PKE card formed as a chip card in a similar conventional way as with antenna coils comprises a number of M antenna coils which are orthogonally aligned with respect to each other so that 3 antenna coils being at least equal to a number of M "cover" the three-dimensional space. Each of the M antenna coils on the PKE card is connected to a receiver stage, denoted as "LF receiver", for receiving an LF channel.

The arrangement according to the invention further comprises a PKE base station having a number of N antenna coils. These N antenna coils should be possibly separated spatially on or in the vehicle and (in the case of a number N of at least 3) should preferably also "cover" a space. Each of the N antenna coils of the PKE base station is connected to an associated transmitter stage, denoted as "LF transmitter", for supplying an LF channel.

The PKE base station further comprises a number of UHF receiver stages denoted as "UHF receivers". For positioning the "UHF receivers" of the PKE base station on the vehicle, the same applies as for the N antenna coils of the PKE base station connected to the "LF transmitters". In the embodiment of FIG. 3, the number and positions of the "UHF receivers" are chosen to correspond to the number and the positions of the "LF transmitters" and the antenna coils connected thereto, but the number and positions of the "UHF receivers" need not necessarily correspond to those of the "LF transmitters". The minimum numbers are N=2 and M=3; the security of the system according to the invention can be further improved by increasing the "LF transmitters" and "UHF receivers" to N=3.

The "UHF receivers" of the base station in the PKE card face a UHF transmitter stage denoted as "UHF transmitter". This stage transmits a UHF signal which is received by the "UHF receivers" of the base station.

The system according to the invention further comprises, both in the PKE card and in the PKE base station, a control stage each, denoted as "controlling and evaluating electronics" for controlling the transmitter and receiver stages and the signal transmissions to be effected by means thereof.

The embodiment of the arrangement according to the invention operates as follows.

In the first step, the PKE card computes its own orientation and its own location relative to the fields of the N antenna coils of the PKE base station. To this end, the N antenna coils of the PKE base station are consecutively switched on for a short period in a defined sequence which is known to the PKE card and transmit their magnetic fields. This is denoted by the references 1 (LF) and 2 (LF) in FIG. 3. The control stage of the PKE card each time measures the amplitude of the voltage induced thereby at their M antenna coils. With reference to the ratio of the measured amplitudes, the control stage of the card can compute the orientation of each N magnetic field relative to the card. Additionally, the geometrical mean value of the measured amplitudes may be utilized for the computation. After performing all measurements and determining the relative orientation with respect to all N magnetic fields, the control stage of the card can thus determine from the orientation information thus gained (representable as direction vectors) its position relative to the antennas of the PKE base station (and hence to the vehicle) in the plane (for the case where a system with N=2 is set up) or even in the space (for the case where a system with N=3 is set up).

In the second step, the PKE card transmits the relative location information thus gained to the UHF antennas of the PKE base station in an encrypted form by means of a crypto-algorithm and a secret key. This transmission process is denoted by the reference numeral 3 in FIG. 3. Then—or optionally analogous to the first step in a separate measuring phase during which the PKE card transmits a constant UHF signal—the "UHF receivers" of the PKE base station measure—ideally simultaneously—the field strength of the received UHF signal (reception signal strength) and/or the phase position of the received UHF signal between the "UHF receivers". The relative position of the PKE card transmitting the UHF signal is computed from this position in the PKE base station (analogously to the first step) with reference to the "UHF receivers" (and hence to the vehicle).

In the third step, the position information components determined by the two communication partners PKE card and PKE base station are compared in the PKE base station. The PKE base station supplies a signal for opening the door of the vehicle only when the position information components are different to at most an extent allowed by the tolerances of the measuring electronics. However, if the position information components determined are different to a greater extent, this may indicate a potential attack. The PKE base station blocks the opening of the door in this case. The potential attack is thereby prevented.

The present invention has the following advantages:
  realization of a PKE system which is highly resistant to external attacks (making the so-called "relay attacks" very difficult),
  the introduction, according to the invention, of additional position and orientation information components makes it considerably more difficult to attack the system,
  the encryption of the transmitted location information additionally enhances the system security,
  by multiplexing with other signals, low-cost multiple use of hardware which is present anyway in the vehicle or of electronic circuitry of space entry control systems is also possible,
  the invention enhances security and measuring accuracy by increasing the number of antenna coils for the LF channel(s) and/or by increasing the number of "UHF receivers".

In modifications of the arrangement according to the invention, the following measures may be taken:
- the location information can be determined either from the field strength and/or the phase differences,
- the number N of "receivers" on the vehicle and the number M of antenna coils on the PKE card may be varied,
- automatic calibration of the systems and enhancing the measuring accuracy by reference measurements (both of the antenna coils of the PKE card and the "UHF receivers") is possible.

What is claimed is:

1. An arrangement for a passive keyless entry system comprising:
a base station arranged on an object to be secured against unauthorized access and a portable data carrier wherein the data carrier and the base station are configured to determine authorized access of the base station
wherein the data carrier includes a plurality of orthogonally aligned antenna coils each being coupled to a LF receiver stage, and a UHF transmitter stage,
wherein the base station includes a plurality of LF transmitter stages, an antenna coil associated with each LF transmitter stage a plurality of UHF receiver stages for receiving an UHF signal from the data carrier,
wherein first position information of the relative position of the data carrier with respect to the antenna coils of the base station is gained from a measurement of the low-frequency, magnetic alternating fields transmitted by the LF transmitter stages of the base station to the data carrier, which information is transmitted in the UHF signal from the data carrier to the base station,
wherein second position information of the relative position of the data carrier with respect to the UHF receiver stages of the base station is gained from a subsequent measurement of the UHF signal transmitted by the UHF transmitter stage of the data carrier to the base station,
wherein a signal representing authorized access is generated by the base station when both position information components differ by less than a predetermined extent.

2. An arrangement as claimed in claim 1, wherein the two position information components are determined by measuring the field strengths and/or the phase differences of the magnetic alternating fields at the locations of the antenna coils of the data carrier coupled to the respective LF receiver stages, or by measuring the UHF signal at the locations of the UHF receiver stages of the base station.

3. The arrangement as claimed in claim 1, wherein the data carrier is a chip card.

4. A base station for an arrangement in a passive keyless entry system with a data carrier, the base station comprising:
a plurality of LF transmitter stages;
an antenna coil associated with each LF transmitter stage;
a plurality of UHF receiver stages for receiving an UHF signal from the data carrier; and
a processor configured to generate a signal representing authorized access when a first and second position information components differ by less than a predetermined extent, wherein the first position information of the relative position of the data carrier with respect to the base station is determined from a measurement of the low-freguency, magnetic alternating fields transmitted by the LF transmitter stages of the base station to the data carrier, which information is transmitted in the UHF signal from the data carrier to the base station, and wherein the second position information of the relative position of the data carrier with respect to the UHF receiver stages of the base station is determined from a subsequent measurement of the UHF signal transmitted by the UHF transmitter stage of the data carrier to the base station.

5. A data carrier for an arrangement in a passive keyless entry system with the base station as claimed in claim 4, the data carrier comprising: a plurality of orthogonally aligned antenna coils each being coupled to a LF receiver stage, and a UHF transmitter stage.

* * * * *